United States Patent
Sahraei Esfahani

(10) Patent No.: US 7,461,889 B1
(45) Date of Patent: Dec. 9, 2008

(54) COLLISION SAFETY STRUCTURE

(76) Inventor: Elham Sahraei Esfahani, 20015 Silver Creek Ter., Apt. #403, Ashburn, VA (US) 20147

( * ) Notice: Subject to any disclaimer, the term of this patent is extended or adjusted under 35 U.S.C. 154(b) by 271 days.

(21) Appl. No.: 11/584,647

(22) Filed: Oct. 23, 2006

Related U.S. Application Data

(60) Provisional application No. 60/761,769, filed on Jan. 25, 2006, provisional application No. 60/774,206, filed on Feb. 17, 2006.

(51) Int. Cl.
 *B60N 2/427* (2006.01)
 *B62D 25/20* (2006.01)

(52) U.S. Cl. ............... 296/187.08; 296/68.1; 296/204

(58) Field of Classification Search ............ 296/184.1, 296/187.03, 187.08, 187.09, 193.07, 193.09, 296/203.01, 203.02, 204, 68.1; 297/216.1, 297/216.16, 216.19, 216.2; 105/329.1, 344, 105/345, 396–403, 413–419, 422
See application file for complete search history.

(56) References Cited

U.S. PATENT DOCUMENTS

| | | | | |
|---|---|---|---|---|
| 3,586,466 A | * | 6/1971 | Erickson | 418/80 |
| 3,837,422 A | * | 9/1974 | Schlanger | 280/734 |
| 3,989,119 A | * | 11/1976 | Cady | 180/89.1 |
| 5,251,911 A | * | 10/1993 | Blake | 296/35.1 |
| 5,287,813 A | * | 2/1994 | Hanni et al. | 105/396 |
| 5,409,262 A | * | 4/1995 | McLennan | 280/784 |
| 5,490,706 A | * | 2/1996 | Totani | 296/68.1 |
| 5,738,378 A | * | 4/1998 | Yazejian | 280/784 |
| 6,206,461 B1 | * | 3/2001 | Gaiser | 296/204 |
| 6,296,300 B1 | * | 10/2001 | Sato | 296/187.08 |
| 6,299,240 B1 | * | 10/2001 | Schroeder et al. | 296/203.01 |
| 6,416,118 B1 | * | 7/2002 | Schlusemann | 296/187.08 |
| 6,435,592 B2 | * | 8/2002 | Nilsson | 296/68.1 |
| 6,454,351 B2 | * | 9/2002 | Motozawa et al. | 297/216.16 |
| 6,464,275 B2 | * | 10/2002 | Laurent et al. | 296/35.2 |
| 6,840,570 B2 | * | 1/2005 | Bock et al. | 296/193.07 |
| 7,055,893 B2 | * | 6/2006 | Yamamura et al. | 296/187.08 |
| 7,188,893 B2 | * | 3/2007 | Akasaka | 296/204 |
| 2001/0026079 A1 | * | 10/2001 | Laurent et al. | 296/189 |
| 2002/0027368 A1 | * | 3/2002 | Volz et al. | 296/66 |

* cited by examiner

*Primary Examiner*—Glenn Dayoan
*Assistant Examiner*—Gregory Blankenship

(57) ABSTRACT

A collision safety structure is provided to decrease the extent of injuries exerted to occupants in vehicle accidents. The collision safety structure utilizes a diagonally positioned beam to guide buckling in a desired direction during impact and acts as an energy absorber in high speed impacts. The diagonally positioned beam directs a counterclockwise motion to the occupant to counteract a clockwise motion which typically occurs in a head on collision. By guiding the buckling effect of the seat and occupant on impact, an occupant is preserved from the crash scene eliminating lower head and thorax accelerations, thus lower perils of injuries in a cost effective and feasible way.

30 Claims, 4 Drawing Sheets

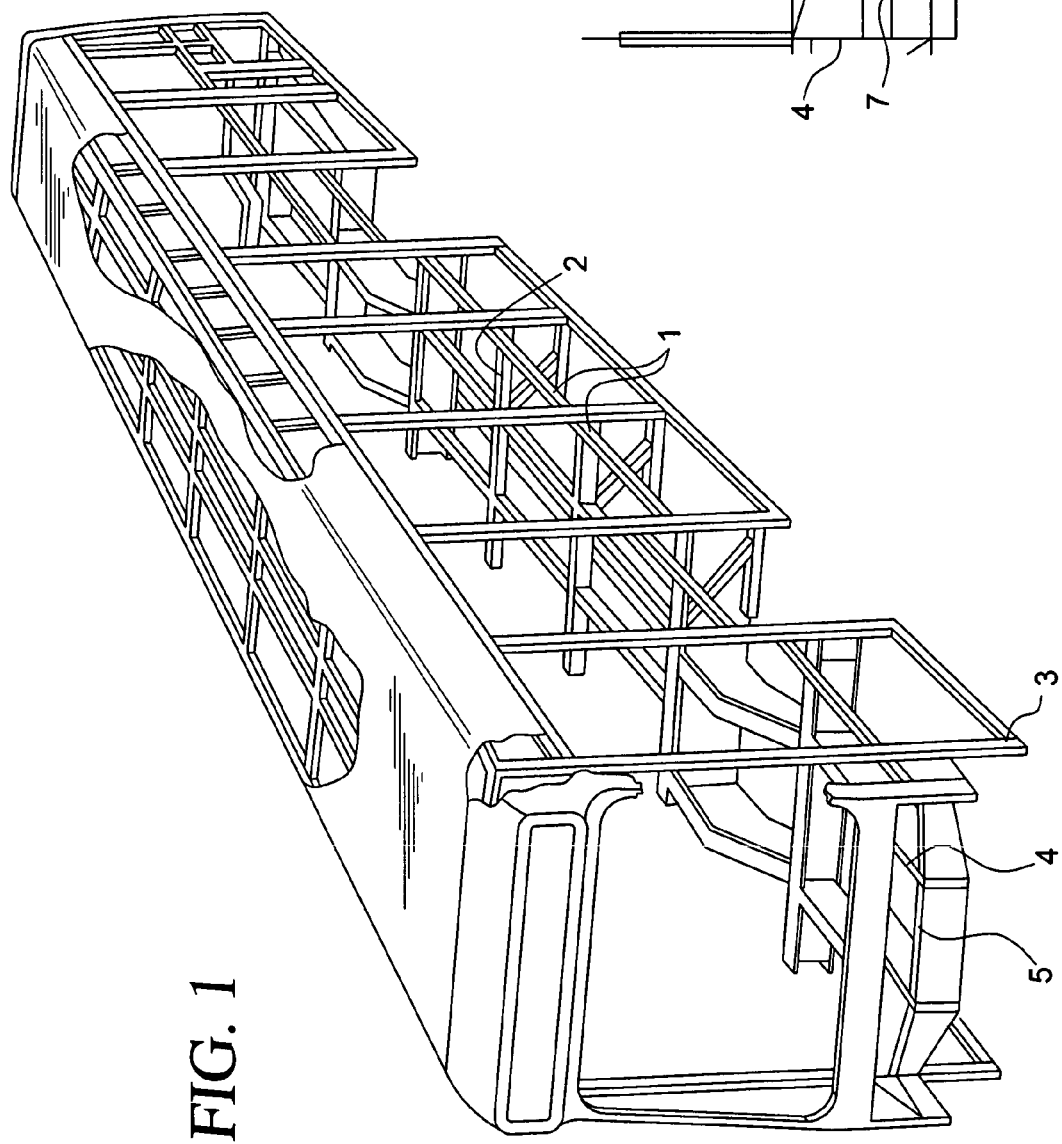

COLLISION SAFETY STRUCTURE

RELATED CASES

This application relates to the following provisional applications:

U.S. Provisional Application: 60/761,769, filed Jan. 25, 2006

Title: Vehicle Sub Floor Structure

Inventor: Elham Sahraei Esfahani

U.S. Provisional Application: 60/774,206, filed Feb. 17, 2006

Title: Vehicle Sub Floor Structure

Inventor: Elham Sahraei Esfahani

BACKGROUND OF THE INVENTION

Field of the Invention

The present invention relates to the field of vehicle body framework structures, and, more specifically, to the field of safety structures for use in vehicle body flooring systems.

Motor vehicle traffic has been the leading cause of death for the 1 to 44 year-old age group in the U.S. and about 40% of serious brain injuries are due to traffic related causes. Head on collisions involving vehicles, result in passengers being thrown toward the front of the vehicle at an acceleration rate affected by the substructure of the flooring and undercarriage. Of particular interest is the structure between the front of the vehicle and the structure located under the driver's seat and the area which extends from one side of the vehicle to the other side in this area.

A typical subfloor frame for buses is shown in U.S. Pat. No. 4,773,701 to Messori. This is a common frame for a bus which has I-beams and cross bars. The front area includes a large bumper section and beams which make up the framework for mounting the floors, seats, walls and roof. Other types of buses, which are initially designed for disabled persons, are low-floor buses which reduce the boarding height. The main platform is a single step far from the ground, and its boarding and aligning time is 13-15% less than its competitors. These features have made low-floor buses popular as the airport or regular city service buses.

Prior art vehicle flooring and framework systems include crossbars and rails designed to support the passengers but fail to address impact issues. Those issues are generally addressed with bumper and fender designs. There exists a need for a vehicle frame which reduces the risk of serious injury in head on collision.

SUMMARY OF THE INVENTION

In view of the foregoing disadvantages with prior art subfloors for use in vehicles now present in the prior art, the present invention provides an improved collision safety structure designed to reduce the risk of sever injury to an occupant or driver of the vehicle.

It is an object of the present invention to provide a collision safety structure in the subfloor of a vehicle under a seat assembly which will produce a counter clockwise motion to the occupant seat and to counteract the clockwise acceleration produced by the nature of frontal impact. This counteraction decreases the acceleration transmitted to the occupant body and head significantly and prevents the occupant from going through the frontal parts of vehicle like the steering wheel, the dashboard and the front window.

It is another object of the present invention to provide a collision safety structure in the subfloor of a vehicle under a seat assembly which will increase the deformation and energy absorption of the structure in the crash and distribute the energy not only in longitudinal direction but across the structure after a head on collision.

It is still another object of the present invention to provide a collision safety structure in the subfloor of a vehicle under a seat assembly which will decrease the acceleration transmitted to the occupant during a head on collision.

Another object of the present invention to provide a collision safety structure in the subfloor of a vehicle under a seat assembly which will decrease the acceleration transmitted to the occupant after a head on collision.

The present invention provides a collision safety structure in the subfloor of a vehicle under a seat assembly which will produce a counter clockwise motion to the occupant seat and to counteract the clockwise acceleration produced by the nature of frontal impact. This counteraction decreases the acceleration transmitted to the occupant body and head significantly and prevents the occupant from going through the frontal parts of vehicle.

BRIEF DESCRIPTION OF THE DRAWINGS

FIG. 1 illustrates a plan skeletal view of the prior art vehicle subfloor and framework.

FIG. 2 illustrates an example of cross sectional view of the prior art cab and subfloor.

DETAILED DESCRIPTION OF THE INVENTION

Figure 3:
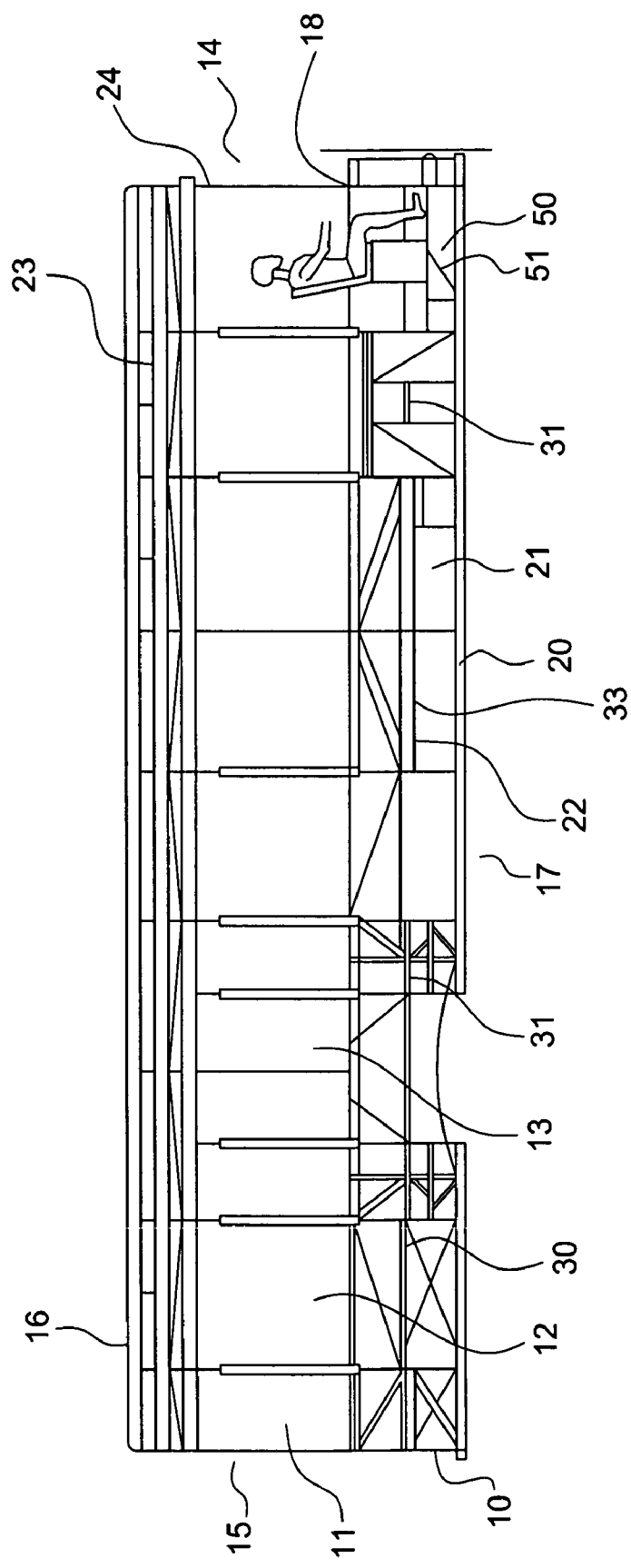
FIG. 3 illustrates a cross sectional skeletal view of a low floor bus with the collision safety structure.

The present invention is directed to a collision safety structure for limiting severe injury to an occupant in the cab portion of a vehicle as a result of head on impact and more specifically to means for guiding the motion of the occupant during impact of a head on collision. The application is based on published document "Reducing Occupant Injury In Frontal Crashes For a Low-Floor City Bus", IMECE2005-83113, Proceedings of IMECE2005, 2005 ASME International Mechanical Engineering Congress and Exposition, Nov. 5-11, 2005, Orlando, Fla. USA which hereby incorporated by reference and authored by the present inventor.

With reference to FIG. 1, a prior art framework for a vehicle, such as a passenger bus, is disclosed. The framework 1 includes longitudinal beams 2, a cab frame 3, a cab frame substructure 4 and a cab panel 5. As shown in FIG. 2, a typical cab frame substructure 4 includes a series of long beams 6 and cross beams 7 for supporting a floor 8 to which a seat 9 is mounted for the driver or occupant. Other than the beams 6, most of the parts like the floor are made of sheet metal. The cab panel 5 and the beams 6 absorb most of the impact energy in a head on collision. Unfortunately, in the case of a severe head on collision, the prior art framework and beams under the seat 8 buckle producing a clockwise rotation of the seat throwing the occupant forward at an accelerated rate. Also the nature of the impact produces a clockwise rotation to the cab frame increasing the risk of serious injury. This common type of framework fails to provide protection for the occupant in case of a severe head on collision.

Figure 4:
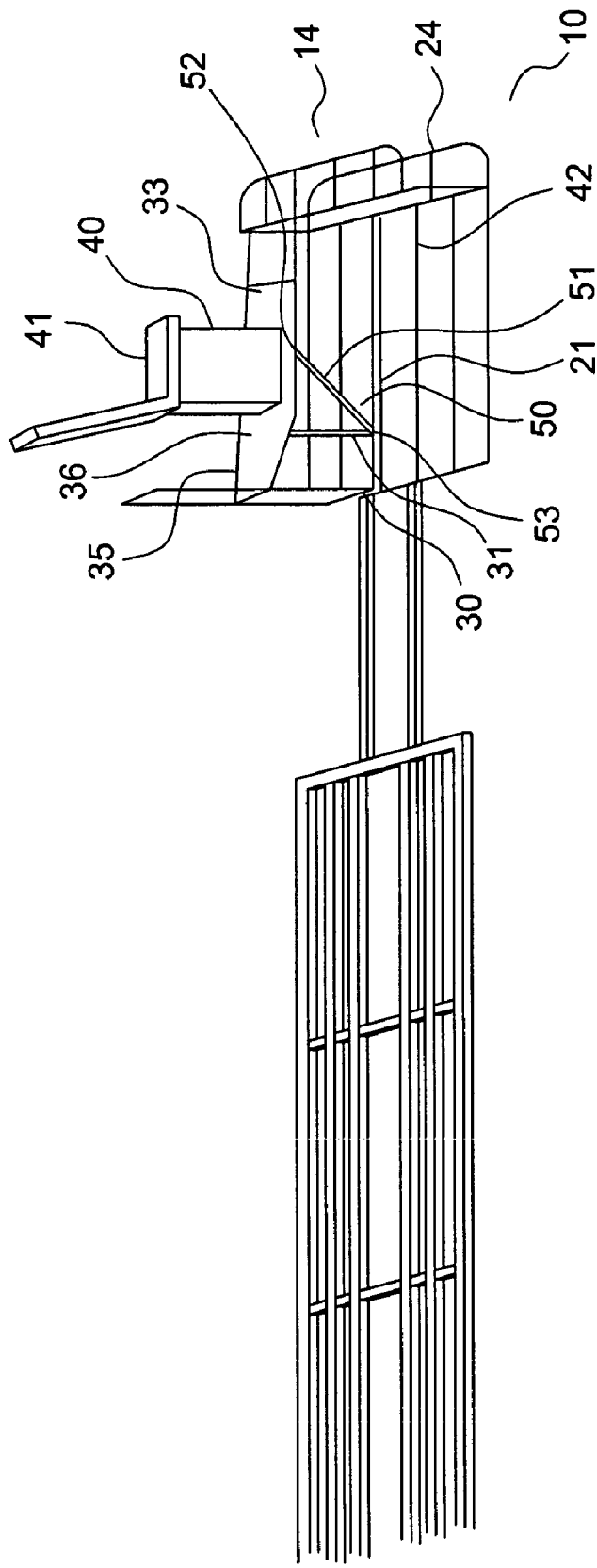
FIG. 4 illustrates partial skeletal view of a collision safety structure of the present invention.

The present invention is illustrated in FIGS. 3 and 4. A vehicle framework 10 includes a body 11 with sidewalls 12, 13, a front portion 14, a rear portion 15, a top portion 16, a bottom portion 17, and a cab 18. The cab 18 is located in the front portion 14 of the vehicle 10. Structural parts are all rectangular steel beams with different thicknesses and sizes.

FIG. 3 further illustrates a skeletal view of framework assembly 20 which includes a substructure 21, a flooring assembly 22, a roof assembly 23, and a cab frame 24. The substructure 21, the flooring assembly 22 and the roof assembly 23 generally extend from the front to the rear of the vehicle 10. The cab frame 24 is incorporated into the substructure 21 as well as the roof assembly 23.

The substructure 21 includes a series of longitudinal steel beams 30 and cross beams 31 which extend from the rear to the front and from side to side inside the substructure 21 and inside the body 11 of the vehicle 10. These are the major load carrying and energy absorbing members of the substructure. Both beams 30, 31 are continuous or can be discontinuous depending on the substructure of the vehicle. The beams provide support for the flooring assembly 22 which supports a floor 33. While a detailed framework assembly is illustrated in FIG. 3, the present invention is applicable to any framework assembly for a vehicle.

Turning now to FIG. 4, the cab frame 24 includes floor support frame 35 which supports the floor 33 under area 36 for a driver or occupant of the vehicle 10. Positioned inside the cab frame 24. On the floor 33 is a seat assembly 40 which includes a seat 41 which is typically mounted to the floor 33 by welding or mechanical fasteners. In some instances, cross beams 31 are mounted in the substructure under the floor 33 in the cab 18. The substructure 21 under the floor 33 inside the cab assembly 24 includes a subfloor 42 which supports the area under the floor 33 inside the cab assembly. The subfloor 42 extends to the front portion 14 of the vehicle 10 and plays a major role in absorbing impact from any type of collision to the front of the vehicle due to the make up of one or more longitudinal beams 30 and cross beams 31 located inside subfloor 42.

Attached inside the subfloor 42 is a guide means 50 for guiding buckling of the floor under the seat and movement of the occupant during head on impact. The guide means 50 utilizes a diagonally positioned beam 51 located inside the subfloor 42 of the cab assembly 24 to guide the buckling of the floor under seat assembly 40 and movement of the driver of the vehicle during impact from a head on collision. The diagonally positioned beam 51 has a proximal end 52 and a distal end 53. The distal end 53 is mounted on one or more of the longitudinally extending beams 30 near cross beams 31. The proximal end 52 is mounted under the seat 41 to the floor 33. (In addition to this application, the diagonally positioned beams like 51 may extend the width of the framework assembly 11 or may extend widthwise the length of the seat assembly 40 to absorb energy. Alternatively, the diagonally positioned beams like 51 may extend laterally across the subfloor 42 at any distance less than the width of the body 11). Of critical importance is location of the proximal end 52 directly under central area 54 of the seat assembly 40. The guiding means has 2 advantages, first absorb crash energy and reduce acceleration in exchange of increasing deformation, second the special place described produces a counter clockwise motion to the occupant seat and counteracts the clockwise acceleration produced by the nature of a head on collision.

The operation and the calculations for the guide means 50 will now be described in detail. Prior art assemblies typically provided the structure as shown in FIGS. 1 and 2 with a seat 9 is located on the floor 8. If there is an occupant restrained with a three point belt to the seat located in the vehicle, and the vehicle experiences a frontal crash, impact of such a crash will produce a frontward movement and a clockwise rotation of the occupant relative to its seat.

Upon severe head on collision, the frontal impact is strong enough to make the beam under the driver's seat buckle. Provided that cross section height of the beam is less than its width, the structure under the driver's seat 8 would buckle downward. If the beam under the driver's seat buckles downward, the seat and accordingly the driver on the seat 9 experience another clockwise rotation. This clockwise rotation in addition to initial rotation due to nature of frontal crash produces a severe rotation of the occupant toward frontal parts of the vehicle.

In accordance with the construction of the present invention, a guide means 50 in the form of a diagonal beam 51 beside a cross beam 31 is positioned under seat assembly 40 as described above. The guide means 50 provides a structure to produce the desired motion for the occupant seat 41 and makes the occupant move away from the crash scene by guiding the direction of buckling upward. The placement of centrally positioning the proximal end 52 of the diagonally positioned beam 51 under the seat 41 and the placement of the distal end 53 of the diagonally positioned beam 51 are critical to produce the desired mode of buckling.

Figure 6:
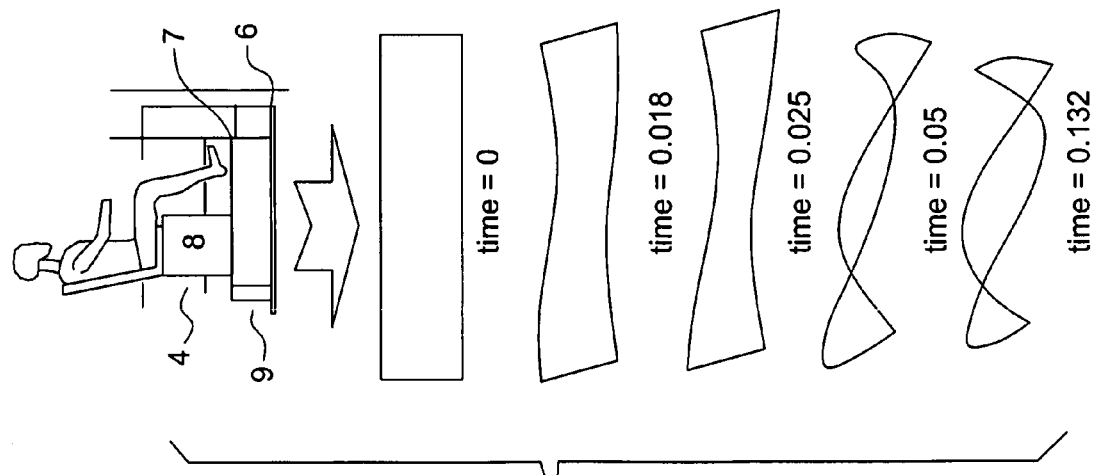
FIG. 6 illustrates a schematic representation of a frontal end collision of the collision safety structure of the present invention.

Placement of diagonal beam 51 under the driver seat 41 cause the seat and driver to buckle upward as shown in FIG. 6, the seat 41 and accordingly the occupant experience a counter clockwise rotation due to the location of the diagonally positioned beam. This counter clockwise rotation encounters the initial rotation due to nature of frontal crashes and prevents the occupant from moving toward the frontal parts of the vehicle such as the front windows and the dashboard. While the application shown in the drawings depicts a bus, the collision safety structure of the present invention is applicable to SUVs, vans, trucks and train subfloor structures, and even passenger cars.

Location of the diagonal beam has two advantages. First, the diagonally positioned beam 51 increase the deformation and energy absorption of the structure in the crash and distribute the energy not only in longitudinal direction but across the structure. With more energy absorption, this structure will decrease the acceleration transmitted to the occupant. The second advantage of this invention is related to the place it is used, under the driver seat, and guiding the buckling of the beam in the way that produces a counter clockwise motion to the occupant seat and to counteract the clockwise acceleration produced by the nature of frontal impact. This counteraction decreases the acceleration transmitted to the occupant body and head significantly and prevents the occupant from going through the frontal parts of vehicle like the steering wheel, the dashboard and the front window. While a diagonal beam 51 is shown in the drawings, the guiding means could be a series of one or more diagonally positioned beams or a diagonally positioned plate made of steel.

Figure 5:
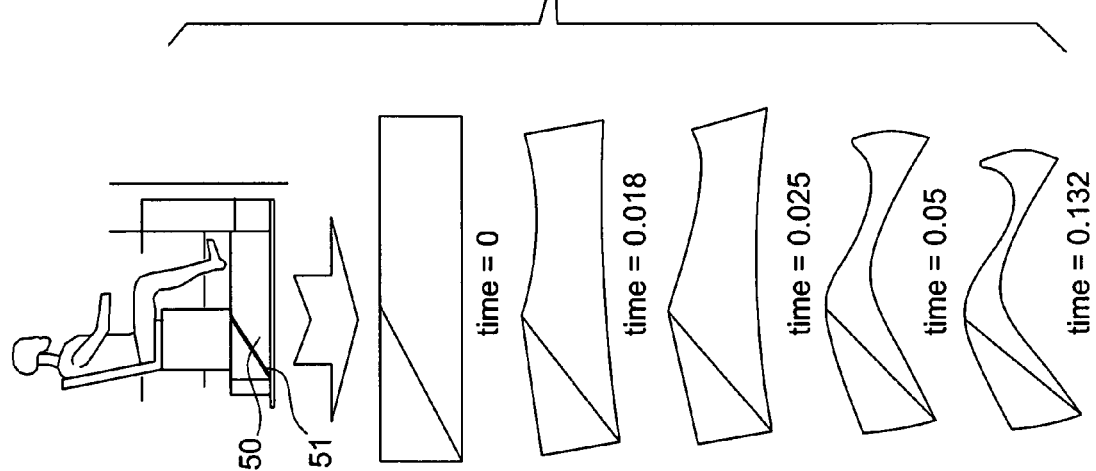
FIG. 5 illustrates a schematic representation of a frontal collision without the collision safety structure.

These two effects of such a structure are examined in finite element models in the publication "Reducing Occupant Injury in Frontal Crashes for a Low-Floor City Bus", IMECE2005-83113, Proceedings of IMECE2005, 2005 ASME International Mechanical Engineering Congress and Exposition, Nov. 5-11, 2005, Orlando, Fla. USA which hereby incorporated by reference and authored by the present inventor. FIGS. 5 and 6 illustrate the time and effect of frontal impact with and without the collision safety structure installed in the subfloor. FIG. 5 illustrates a three point restrained occupant in a frontal crash. The results of the impact gives the occupant two clockwise rotations as illustrated in the schematic. Using a diagonally positioned beam, as illustrated in the schematic in FIG. 6, the buckling is guided upward in a way that the seat is rotated counterclockwise. This motion counteracts the clockwise rotation of the occupant and therefore, reduces the overall acceleration of the occupant and therefore the risk of injury. FIGS. 5 and 6 illustrate function of the invented structure in finite element model of a bus. The model includes the bus, a hybrid III dummy as its occupant restrained with a three point belt to its seat, and the complete model is positioned in frontal crash situation according to FMVSS 208 test. Results for the initial model with out this invention and the modified model including the invention are compared, simulated in a frontal crash of 30 mph according to FMVSS 208. As illustrated, each model discloses the results of the vehicles as they meet in a head on collision. All specifications of these two models are the same except than the invente collision safety structure is used in the second model. Results show that the second model has much more deformations than the first model and reduction in acceleration caused by the diagonal beam. This reduction in acceleration is the first advantage of using the invented structure.

The second advantage of using this invention is the upward buckling of the seat assembly. The results disclose how the diagonal beam is changing shape of buckling and guiding the buckling of beam under driver seat to second mode of buckling and the beam has buckled in the way that produces a counter clockwise rotation for the occupant seat. Accelerations of head and thorax are substantially reduced and severe injury is diminished. This is an example of using this invention in frontal position and for a bus, but this invention can be used for other directions as well and for other kinds of vehicles. With use of different lengths for the diagonal beam and attaching the point in different places produces different modes of buckling and creates different kinds of motions. The overall structure may be used for rear end or side crashes as well by applying the structure in the desired direction and configuration. Also it is not limited to motor vehicle crashes, anywhere else it could be used to control crash effects. This is very hard to produce any kind of utility to act in a fraction of second as in crashes. This invention is advantageous in crash scenarios because it controls buckling which is an immediate and impulsive phenomenon, and the nature of this phenomenon is capable of encountering nature of crashes.

What is claimed is:

1. A collision safety structure for limiting severe injury to an occupant in a vehicle as a result of head on impact, said collision safety structure comprising,
    a vehicle framework,
    a vehicle substructure,
    a cab frame, said cab frame including a floor support frame for supporting a floor, said floor supporting a seat assembly and a seat, said cab frame having a subfloor including guide means for guiding buckling of the floor attached to seat upward for producing a counter clockwise motion to the occupant seat and to counteract clockwise acceleration produced by the nature of a head on impact.

2. The collision safety structure as recited in claim 1, said collision safety structure including a diagonally positioned beam, said diagonally positioned beam having a proximal end and a distal end, said distal end connected to a substructure under said seat and said proximal end connected to said floor under said seat near the center of said seat.

3. The collision safety structure as recited in claim 1, said guide means including two or more of diagonally positioned beams, each beam having a proximal end and a distal end, said distal end connected to a framework under said seat and said proximal end connected to said floor under said seat.

4. The collision safety structure as recited in claim 1, said guide means including a diagonally positioned plate.

5. The collision safety structure as recited in claim 1, said guide means including a diagonally positioned beam, said beam having a proximal end and a distal end, said distal end connected to a framework under said seat and said proximal end connected to said floor.

6. The collision safety structure as recited in claim 1, said collision safety structure mounted in a bus subfloor.

7. The collision safety structure as recited in claim 1, said collision safety structure mounted in a SUV subfloor.

8. The collision safety structure as recited in claim 1, said collision safety structure mounted in a truck subfloor.

9. The collision safety structure as recited in claim 1, said collision safety structure mounted in a car subfloor.

10. The collision safety structure as recited in claim 1, used in perpendicular direction for side impact safety in a side crash accident rather than head on collision.

11. A collision safety structure for limiting severe injury to an occupant in a vehicle as a result of head on impact, said collision safety structure comprising,
    a vehicle framework,
    a vehicle substructure,
    a cab frame, said cab frame including a floor support frame for supporting a floor, said floor supporting a seat assembly and a seat, said cab frame having a subfloor including at least one cross beam and two longitudinal beams, and
    a diagonally positioned beam, said diagonally positioned beam having a proximal end and a distal end, said distal end connected to a longitudinal beam under said seat and said proximal end connected to another longitudinal beam attached to said floor under said seat near the center of said seat and a vertical cross beam connect two said longitudinal beams and positioned near the distal point of the diagonal beam for guiding buckling of the floor and producing a counter clockwise motion to said occupant seat and to counteract clockwise acceleration produced by the nature of a head on collision.

12. The collision safety structure as recited in claim 11, said guide means including two or more of diagonally positioned beams, each beam having a proximal end and a distal end, said distal end connected to a framework under said seat and said proximal end connected to said floor under said seat near the center of said seat.

13. The collision safety structure as recited in claim 11 said guide means including a diagonally positioned plate.

14. The collision safety structure as recited in claim 11, said guide means including a diagonally positioned beam, said beam having a proximal end and a distal end, said distal end connected to a longitudinal beam under said seat and said proximal end connected to said floor.

15. The collision safety structure as recited in claim 11, said collision safety structure mounted in a bus subfloor.

16. The collision safety structure as recited in claim 11, said collision safety structure mounted in a SUV subfloor.

17. The collision safety structure as recited in claim 11, said collision safety structure mounted in a truck subfloor.

18. The collision safety structure as recited in claim 11, said collision safety structure mounted in a car subfloor.

19. The collision safety structure as recited in claim 11, said collision safety structure mounted in a train subfloor.

20. The collision safety structure as recited in claim 11, used in perpendicular direction for side impact safety in a side crash accident rather than head on collision.

21. A collision safety structure for limiting severe injury to an occupant in a vehicle as a result of head on impact, said collision safety structure comprising, a vehicle framework, a vehicle substructure, a cab frame, said cab frame including a floor support frame for supporting a floor, said floor supporting a seat assembly and a seat, said cab frame having a subfloor including at least one cross beam and one longitudinal beams, and a diagonally positioned beam, said diagonally positioned beam having a proximal end and a distal end, said distal end connected to a longitudinal beam under said seat and said proximal end connected to said floor for guiding buckling of the floor and occupant seat producing a counter clockwise motion to said occupant seat and to counteract clockwise acceleration produced by the nature of a head on collision.

22. The collision safety structure as recited in claim 21, said guide means including two or more of diagonally positioned beams, each beam having a proximal end and a distal end, said distal end connected to a longitudinal beam under said seat and said proximal end connected to said floor under said seat near the center of said seat.

23. The collision safety structure as recited in claim 21, said guide means including a diagonally positioned plate.

24. The collision safety structure as recited in claim 21, said guide means including a diagonally positioned beam, said beam having a proximal end and a distal end, said distal end connected to a longitudinal beam under said seat and said proximal end connected to said floor.

25. The collision safety structure as recited in claim 21, said collision safety structure mounted in a train engine subfloor.

26. The collision safety structure as recited in claim 21, said collision safety structure mounted in a bus subfloor.

27. The collision safety structure as recited in claim 21, said collision safety structure mounted in a SUV subfloor.

28. The collision safety structure as recited in claim 21, said collision safety structure mounted in a truck subfloor.

29. The collision safety structure as recited in claim 21, said collision safety structure mounted in a car subfloor.

30. The collision safety structure as recited in claim 21, used in perpendicular direction for side impact safety in a side crash accident rather than head on collision.

* * * * *